United States Patent [19]

Scherrer

[11] Patent Number: 4,972,648
[45] Date of Patent: Nov. 27, 1990

[54] FURNITURE PANEL AND ELEMENT FOR ATTACHING INSERTS THERETO

[75] Inventor: Kurt Scherrer, Münsingen, Switzerland

[73] Assignee: U. Scharer Sohne AG (USM), Munsingen, Switzerland

[21] Appl. No.: 217,468

[22] Filed: Jul. 11, 1988

Related U.S. Application Data

[62] Division of Ser. No. 98,458, Sep. 18, 1987, abandoned.

[30] Foreign Application Priority Data

Sep. 25, 1986 [CH] Switzerland ............. 3838/86

[51] Int. Cl.⁵ .............................................. E04C 2/34
[52] U.S. Cl. ........................................ 52/802; 52/803
[58] Field of Search ............... 52/802, 803, 145, 437, 52/582, 585, 586

[56] References Cited

U.S. PATENT DOCUMENTS

| | | | |
|---|---|---|---|
| 1,708,351 | 4/1929 | Auld | 52/803 X |
| 1,876,596 | 9/1932 | Belding | 52/803 |
| 2,186,310 | 1/1940 | von Hoefen | 52/437 X |
| 2,221,001 | 11/1940 | Lucius | 52/145 X |
| 2,638,187 | 5/1953 | Tate | 52/802 |
| 2,733,483 | 2/1956 | Anderson | 52/803 X |
| 2,912,725 | 11/1959 | Ries | 52/803 X |
| 3,021,915 | 2/1962 | Kemp | 52/145 X |
| 3,055,460 | 9/1962 | Maroney | 52/437 X |
| 3,082,487 | 3/1963 | Fowler et al. | 52/145 |
| 4,187,649 | 2/1980 | Chaffee | 403/171 X |

Primary Examiner—John E. Murtagh
Assistant Examiner—Lan Mai
Attorney, Agent, or Firm—Zarley McKee, Thomte, Voorhees & Sease

[57] ABSTRACT

Pins of the fastening element fit into holes provided at regular intervals on the center lines of concave edge portions of the panel. The angled edge of a locking cap slipped over the body of the fastening element and fixed to it by a screw locks the element to the edge portions. The locking cap may be dispensed with by using a screw, driven through a hole in the base plate of the panel, to secure the body of the fastening element to the panel. The fastening element and the panel ensure good stability and an attractive appearance.

3 Claims, 6 Drawing Sheets

FURNITURE PANEL AND ELEMENT FOR ATTACHING INSERTS THERETO

This is a divisional of copending application Ser. No. 98,458 filed on Sep. 18, 1987 now abandoned.

This invention relates to furniture assembly, and more particularly to a fastening element for attaching inserts to sidewalls of a furniture structure, as well as to a sidewall for an office furniture structure, of the type having a base plate and four side edges.

With the sidewalls or panels used heretofore in furniture structures, for the purpose of attaching inserts such as tilting doors, sliding doors, shelves, or telescopic extensions, either tracks have been welded in, or else the bent-down edges of the panels have been provided with a snap or catch arrangement which offered little possibility for the subsequent attachment of inserts as mentioned above. Furthermore, prior art panels are not sufficiently stable. Previously used panels are also provided with attachment holes, depending upon the insert, having the drawback that the panels have to be dismantled when inserts are exchanged. Moreover, in the prior art panels for furniture structures, the attachment holes have been applied in such a way that the esthetic impression is unsatisfactory.

Furthermore, panels for furniture structures have been proposed which have a snap or catch arrangement in the form of notches in the edges, used for suspending tracks for the purpose of installing an insert, as mentioned above. A drawback of these panels is that the metal tracks require a great deal of material, and this snap or catch arrangement offers only limited possibilities of assembly. Moreover, this prior art panel is not completely satisfactory from a structural point of view.

It is therefore an object of this invention to provide an improved fastening element and sidewall or panel which do not have the aforementioned drawbacks of the prior art, i.e., which have better stability and are more economical as regards the material used.

Another object of this invention is to provide a fastening element and panel which can be utilized more universally than prior art devices.

A further object of this invention is to provide a fastening element which can be screwed on both sides of the panel.

To this end, the fastening element according to the present invention comprises a basic body having an end face, there being in the end face at least one fastening component connected to the basic body and at least one bore provided in the basic body.

In the sidewall according to the present invention, of the type initially mentioned, passage holes for attaching a fastening element are disposed in the side edges.

Preferred embodiments of the invention will now be described in detail with reference to the accompanying drawings, in which.

Figure 3:
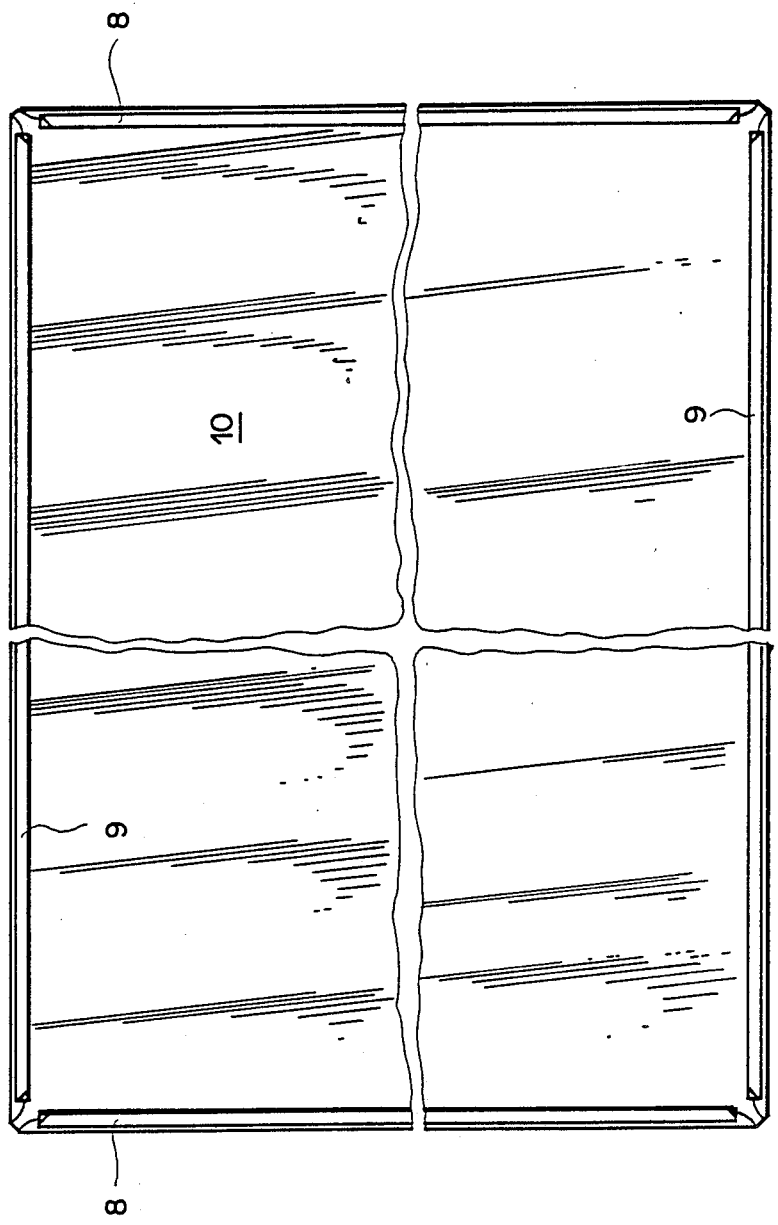
FIG. 3 is a top plan view of the panel of FIG. 2.
Figure 4:
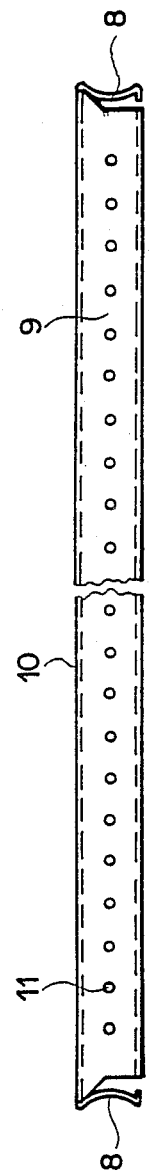
FIG. 4 is a side elevation of the panel of FIG. 3.
Figure 5:
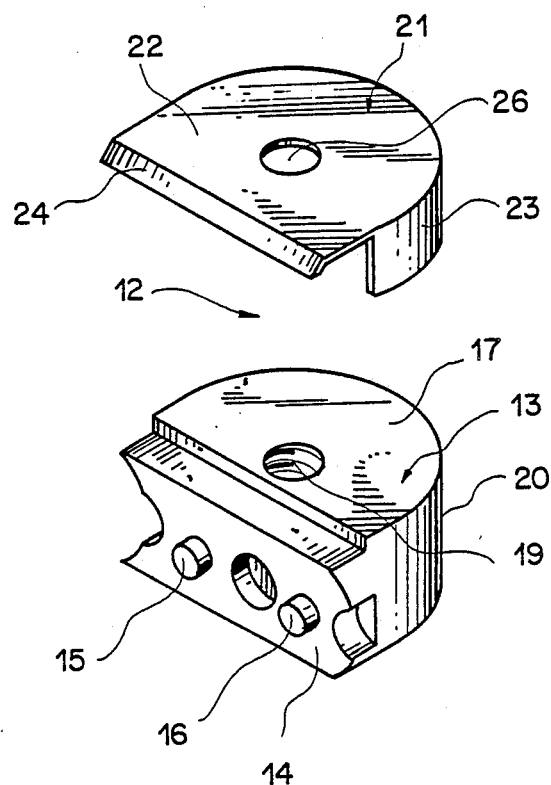
Figure 6:
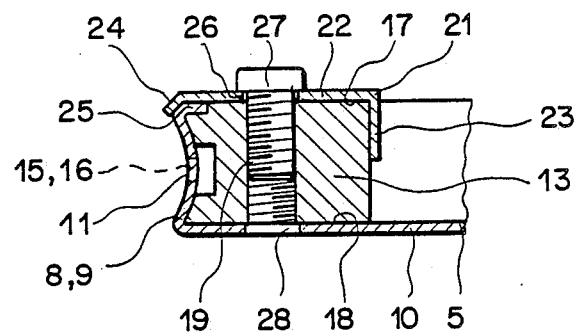
Figure 7:
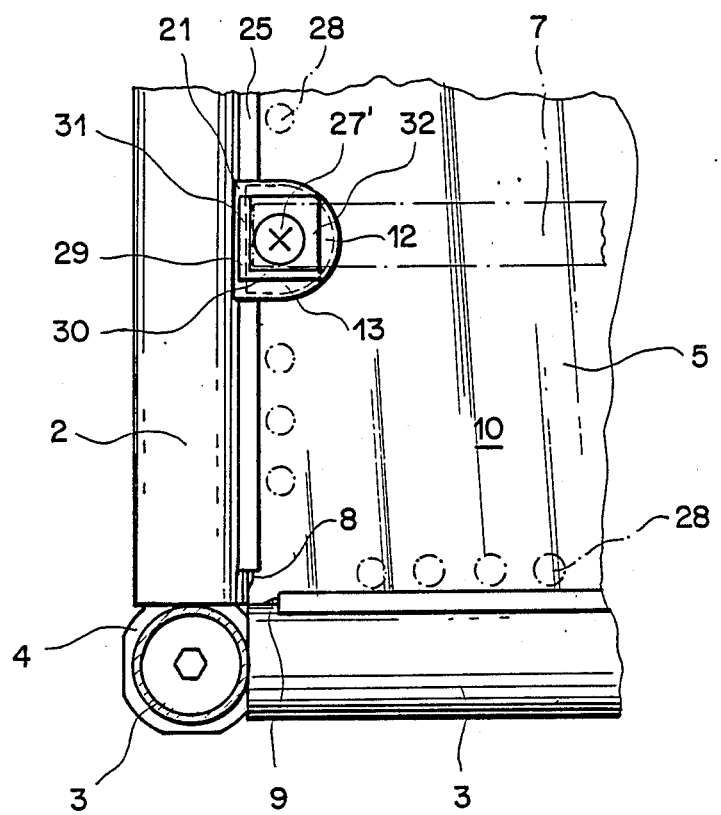
Figure 8:
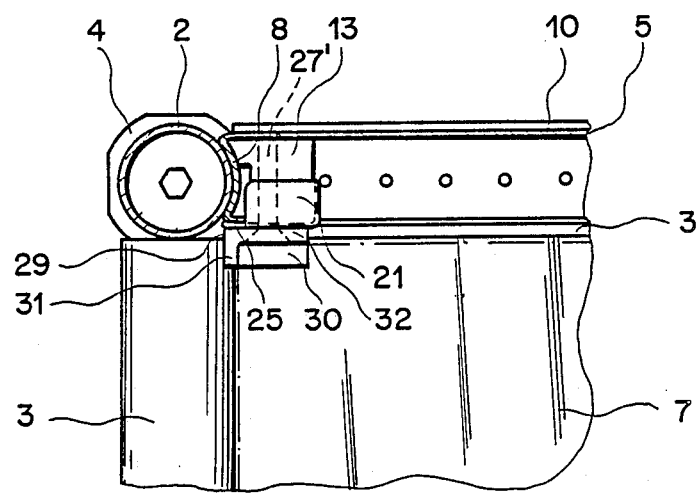
Figure 9:
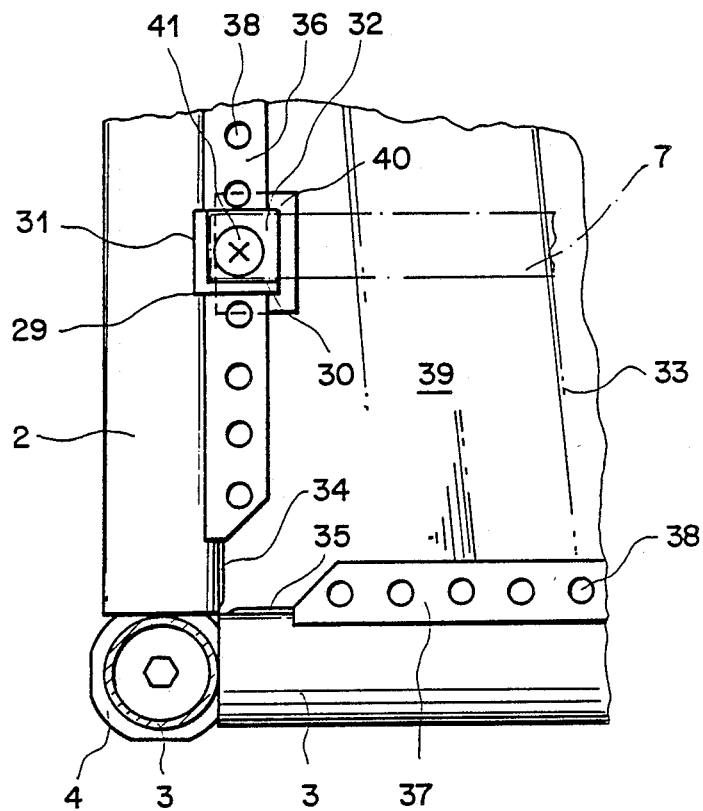
Figure 10:
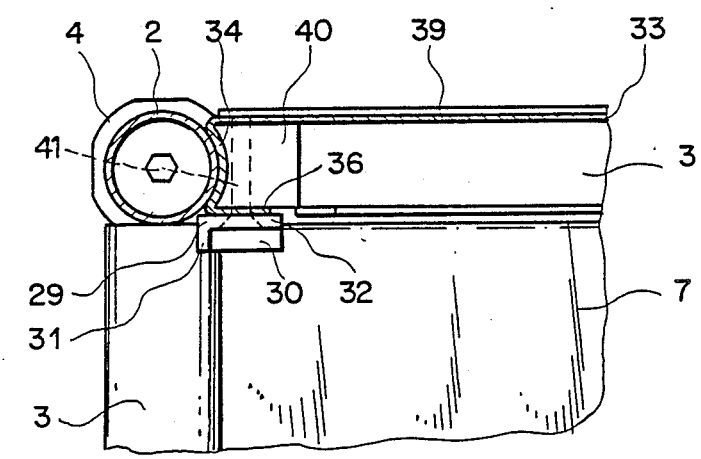
Figure 11:
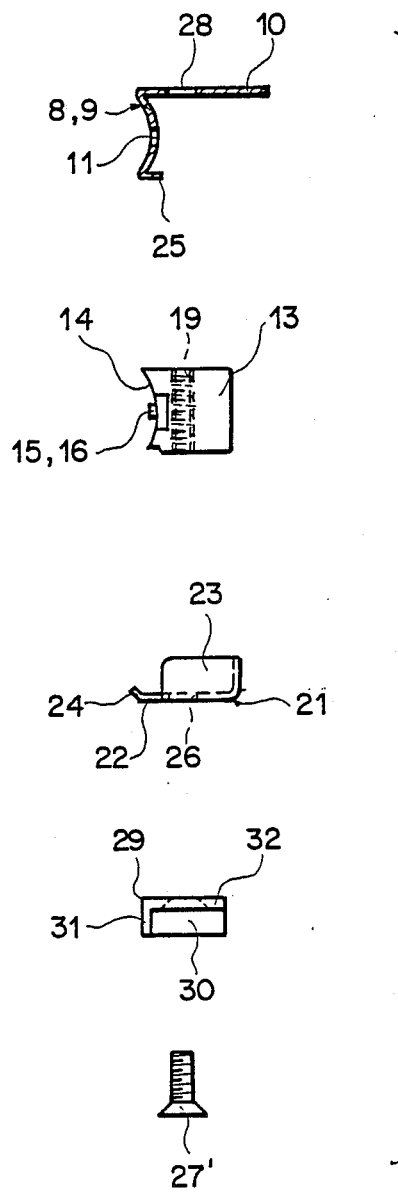

FIG. 5 is a perspective view of a fastening element insertable in the panel of FIGS. 2–4, FIG. 6 is a cross-section through the fastening element of FIG. 5, FIG. 7 is a partial elevation of the panel inserted in the furniture structure with the fastening element and a schematically indicated shelf, FIG. 8 is a top plan view of the panel of FIG. 7, FIG. 9 is a partial elevation of another embodiment of the panel with the fastening element and a schematically indicated inserted shelf, FIG. 10 is a top plan view of the panel of FIG. 9, and FIG. 11 is a sectional view of part of the panel in the first embodiment, together with the fastening element, a fastening angle, and the associated fastening screw.

Figure 1:
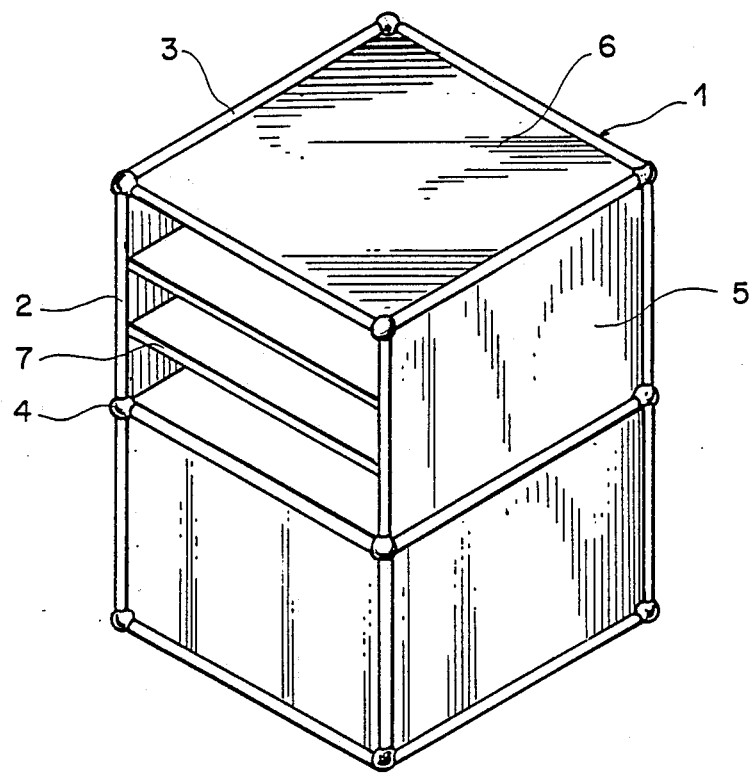
FIG. 1 is a diagrammatic perspective view of a furniture structure.

FIG. 1 illustrates a furniture structure 1 with longitudinal and transverse supports 2 and 3, corner connections 4, panels 5, and a top plate 6, as well as shelves 7 inserted between panel 5.

Figure 2:
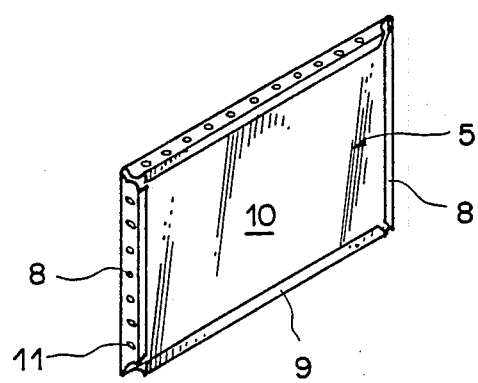
FIG. 2 is a perspective view of a panel for the structure of FIG. 1.

FIG. 2, a perspective view of a panel 5, shows two short-side edge portions 8 and two longitudinal-side edge portions 9 with holes 11 disposed at regular intervals therein along respective straight lines parallel to a base plate 10 of panel 5.

In the top plan view and elevation of panel 5 shown in FIGS. 3 and 4, respectively, it will be seen that edge portions 8 of the short sides and edge portions 9 of the long sides of base plate 10 are concave. The radius of curvature corresponds to the radius of the vertical and horizontal supports 2, 3 of FIG. 1.

A fastening element 12 which can be screwed to the edge portions 8, 9 of panel 5 or to base plate 10 is shown in FIG. 5. It comprises a substantially semicylindrical solid body 13, one lateral surface 14 of which has the same radius of curvature as edge portions 8, 9 of panel 5. Positioned on a center line of surface 14 are two fastening pins 15 and 16 intended to fit into holes 11 in edge portions 8, 9 of panel 5. A bore 19 runs perpendicular to the top and bottom surfaces 17 and 18 of body 13 and parallel to the semicylindrical outside surface 20. A locking cap 21 is provided for securing fastening element 12 to one of the edge portions 8 or 9 of panel 5. Cap 21 includes a semicylindrical rim 23 disposed perpendicular to a cover plate 22. When fastening element 12 is assembled, rim 23 fits over the semicylindrical surface 20 of body 13. Furthermore, the straight bounding edge 24 of cover plate 22 is bent obliquely to fit over the top rim 25 of edge portions 8, 9 of panel 5. Base plate 10, edge portions 8 or 9, and the associated margin or rim 25 define a channel for receiving body 13. A bore 26 is disposed in locking cap 21 in such a way that when cap 21 is set on body 13, bores 26 and 19 are aligned.

FIG. 6, a cross-section through a fastening element 12 screwed to an edge portion 8 or 9 of panel 5, indicates how pins 15 and 16 fit into holes 11 of edge portions 8 or 9. Locking cap 21 is fixed to body 13 by means of a bolt 27, and its bent edge 24 locks body 13 to edge portion 8 or 9. However, body 13 may be secured to edge portion 8 or 9 without any locking cap. For this purpose, bolt 27 is screwed into bore 19 of body 13 through a hole 28 in base plate 10 of panel 5.

FIG. 7 shows a panel 5 inserted in furniture structure 1, with fastening element 12 holding a shelf 7 indicated in dot-dash lines. Edges 8 and 9 of panel 5 rest against vertical and horizontal supports 2 and 3. An angle piece 29 is screwed to fastening element 12 by means of a screw 27′, which likewise locks cap 21 to body 13. Resting on angle piece 29, which comprises three side portions 30, 31, and 32, is one of the four bottom corners of shelf 7. For attaching shelf 7 within furniture structure 1, angle pieces 29 are secured by fastening elements 12 to two edge portions 8 of each of two panels 5.

FIG. 8 is a top plan view, partially in section, of a shelf 7 attached to edge portions 8 by means of angle pieces 29.

In another embodiment, FIG. 9 illustrates a panel 33 having edges 34 and 35, the top portions 36, 37 of which are bent at a 90° angle and include holes 38 for mounting an angle piece 29 intended to hold a shelf 7, for example. Disposed between the angled portion 36 of edge 34 and a base plate 39 of panel 33 is a body 40 having a longitudinal bore. Angle piece 29 is fixed to body 40 by means of a screw 41 passing through one of the holes 38.

The top plan view of FIG. 10, partially in section, depicts shelf 7 attached to panel 33 by means of angle piece 29 and body 40. The advantage of panel 33 as compared with panel 5 in the first embodiment is that it is sturdier because of the more sharply angled top portions. From the esthetic standpoint, however, the first embodiment is more advantageous.

FIG. 11 shows the essential parts of the invention according to the first embodiment, viz., the edge portion 8 or 9 of a panel, a body 13, a locking cap 21, and an angle piece 29.

It is preferable to provide a blind hole between pins 15 and 16 of body 13 to receive the head of a screw which may be on the panel.

What is claimed is:

1. In a panel for a furniture structure, of the type having a base plate and four edge portions, the improvement comprising a plurality of passage holes disposed in each of said edge portions for attaching a fastening element, the edge portions having a concave surface extending substantially at a right angle to the base plate for matingly receiving a support member along the edge portion and the edge portions including margins remote from the base plate which are bent substantially at right angles to the concave surfaces, the base plate, the concave surface of each edge portion and the associated margin defining a channel receiving a complimentary-shaped for reception of a fastening element for connecting the panel to the support member.

2. The panel of claim 1, wherein said passage holes are disposed on the center lines of said edge portions.

3. The panel of claim 1, wherein said passage holes are disposed in said margins of said edge portions.

* * * * *